SUSPENSION SYSTEM FOR VEHICLES

Original Filed Feb. 23, 1966 7 Sheets-Sheet 1

INVENTORS
ARTHUR E. VOGEL
PALMER FULTZ
BY
Schmieding & Fultz
ATTORNEYS

SUSPENSION SYSTEM FOR VEHICLES

Original Filed Feb. 23, 1966 7 Sheets-Sheet 2

INVENTOR.
ARTHUR E. VOGEL
PALMER FULTZ
BY
Schmieding & Fultz
ATTORNEYS

SUSPENSION SYSTEM FOR VEHICLES

Original Filed Feb. 23, 1966 7 Sheets-Sheet 3

INVENTORS
ARTHUR E. VOGEL
PALMER FULTZ
BY
Schmieding & Fultz
ATTORNEYS

SUSPENSION SYSTEM FOR VEHICLES

Original Filed Feb. 23, 1966 7 Sheets-Sheet 4

INVENTOR.
ARTHUR E. VOGEL
BY PALMER FULTZ
Schmieding & Fultz
ATTORNEYS

SUSPENSION SYSTEM FOR VEHICLES

Original Filed Feb. 23, 1966 7 Sheets-Sheet 5

INVENTOR.
ARTHUR E. VOGEL
BY PALMER FULTZ
Schmieding & Fultz
ATTORNEYS

SUSPENSION SYSTEM FOR VEHICLES

Original Filed Feb. 23, 1966 7 Sheets-Sheet 6

INVENTOR.
ARTHUR E. VOGEL
BY PALMER FULTZ
Schmieding & Fultz
ATTORNEYS

SUSPENSION SYSTEM FOR VEHICLES

Original Filed Feb. 23, 1966 7 Sheets-Sheet 7

INVENTOR.
ARTHUR E. VOGEL
BY PALMER FULTZ
Schmieding & Fultz
ATTORNEYS

United States Patent Office

Re. 27,883
Reissued Jan. 15, 1974

27,883

SUSPENSION SYSTEM FOR VEHICLES

Arthur E. Vogel, 1860 E. Cherry St. 43205, and Palmer Fultz, 4280 Hayden Run Road 43221, both of Columbus, Ohio Original No. 3,480,288, dated Nov. 25, 1969, Ser. No. 529,328, Feb. 23, 1966, which is a continuation-in-part of abandoned Ser. No. 479,225, Aug. 12, 1965. Application for reissue Nov. 25, 1970, Ser. No. 92,959
Int. Cl. B62d *37/00;* B60s *9/00*
U.S. Cl. 280—6.1 35 Claims

Matter enclosed in heavy brackets [ ] appears in the original patent but forms no part of this reissue specification; matter printed in italics indicates the additions made by reissue.

ABSTRACT OF THE DISCLOSURE

A controlled suspension system for a vehicle having unsprung and sprung weight portions including a vertically expansible and contractable chamber disposed between those portions, together with a compressor connected with the chamber, the chamber having an outlet orifice which is at least partially opened and closed as the static load on the unsprung portion decreases and increases, respectively.

Preferably, the compressor inlet and the outlet orifice are connected directly with atmosphere. Also, preferably, the control system is embodied as a part of the shock absorbing apparatus for the sprung weight of the vehicle.

*CROSS REFERENCE TO RELATED APPLICATION*

This application is a continuation in part of our copending application Ser. No. 479,225, filed Aug. 12, 1965, now abandoned.

*BACKGROUND OF THE INVENTION*

*(1) Field of the invention*

The present invention relates to suspension systems for vehicles and more particularly to a novel apparatus for automatically controlling such systems.

*SUMMARY OF THE INVENTION*

The apparatus of the present invention is applied to motor vehicles of the type which comprise sprung weight portions each of which includes a wheel and a spring means and is uniquely adapted to maintain a constant predetermined height differential between the sprung and unsprung weight portions by augmenting the forces exerted by the spring means when the height differential between said sprung and unsprung weight portions varies from a normal configuration due to changes in static loading of the vehicle.

In one aspect of the present invention, the compressor inlet and the outlet orifice of the expansible chamber are connected with atmosphere, and the outlet orifice is at least partially opened and closed upon decrease and increase, respectively, of the static loads on the sprung weight portion of the vehicle.

More specifically in another aspect of the invention, the aforesaid orifice is at least partially opened and closed upon vertical expansion and vertical contraction, respectively, of the air chamber.

In general, the control system of the present invention comprises at least two variable shock absorber apparatus each of which is connected in parallel with a respective vehicle spring between the sprung and a respective unsprung weight portion of the vehicle.

For example, in a typical installation two such variable shock absorber apparatus are installed one at each rear spring of the vehicle and each of said shock absorber apparatus includes a shock absorber chamber containing a damping piston the movement of which is controlled in the normal manner by fluid in the shock absorber chamber.

Each shock absorber apparatus further includes a fluid actuated chamber means connected with a source of pressurized fluid, such as air from a compressor mounted on the vehicle and upon the admission or release of fluid from said fluid actuated chamber means, the bias force exerted by the shock absorber apparatus is varied as may be required to compensate for variations in static loading of the vehicle.

As one aspect of the present invention each of the outer fluid actuated chamber means includes a flexible wall portion that forms a flexible sealed junction with the outer wall of the inner shock absorber chamber. The above mentioned flexible wall of one of said two shock absorber apparatus which may be termed the height control apparatus is uniquely shaped and adapted to form a height detection and control valve means that automatically senses variations in height differential between the sprung and unsprung weights and controls the release of pressurized fluid from both shock absorber apparatus so as to establish and maintain a predetermined height differential between weight portions of the vehicle.

The above described flexible wall is uniquely adapted to function as a height detection and control valve means by an extremely simple structural arrangement which consists of forming the flexible wall of U-shaped cross section so that it can roll vertically in sealed surrounding relationship with the wall of the inner shock absorber and by further providing a control valve orifice through the flexible wall at a location intermediate the top and bottom of the wall. Such simple arrangement of basic structural components to perform a valving function eliminates the need for a separate height control mechanism which, if required, would represent a large percentage of the total cost of the system.

As another aspect of the present invention, the above mentioned height control shock absorber apparatus is provided with an expandable and contractable flexible outer housing or boot that forms an exhaust chamber portion of a closed fluid circuit for the flow of pressurized fluid from the pressurized source to the shock absorber apparatus and from said apparatus back to said source.

The above described outer flexible wall or boot, which makes possible a simple and inexpensive closed fluid circuit, not only saves energy by supercharging the intake side of the compressor but also isolates the compressor and shock absorber apparatus from dirt particles and other contaminates thereby making practical the uncontaminated use of the above described height control orifice valving arrangement.

As still another aspect of the present invention the above mentioned control valve orifice is more efficiently sealed by a valve element in the form of a ring or shoulder that engages and stretches the flexible wall at said orifice. In this manner the inherent resiliency of the flexible wall is utilized to provide a more efficient seal at the valve orifice.

As still another aspect of the present invention the height control shock absorber apparatus, in one of its modifications is provided with a novel passage and control orifice construction for controlling the pressure in the fluid actuated chamber. Such passage and orifice construction is formed in a simple and efficient manner by a strip attached to the wall of the shock absorber portion so as to form a channel communicating with said chamber.

As another aspect of the present invention the height control shock absorber apparatus is provided in another of its modifications with an adjustable passage and control orifice assembly that is longitudinally adjustably mounted on the apparatus thereby providing means for ready adjustment of the normal configuration datum line position of the apparatus.

As still another aspect of the present invention the height control shock absorber apparatus is provided in another of its modifications with a pressure control valve adapted to maintain a predetermined residual pressure in the apparatus.

Further features and the advantages of the present invention will be apparent from the following description, reference being had to the accompanying drawings wherein a preferred form of embodiment of the invention is clearly shown.

[In the drawings:]

*DESCRIPTION OF THE PREFERRED EMBODIMENT*

Figure 1:
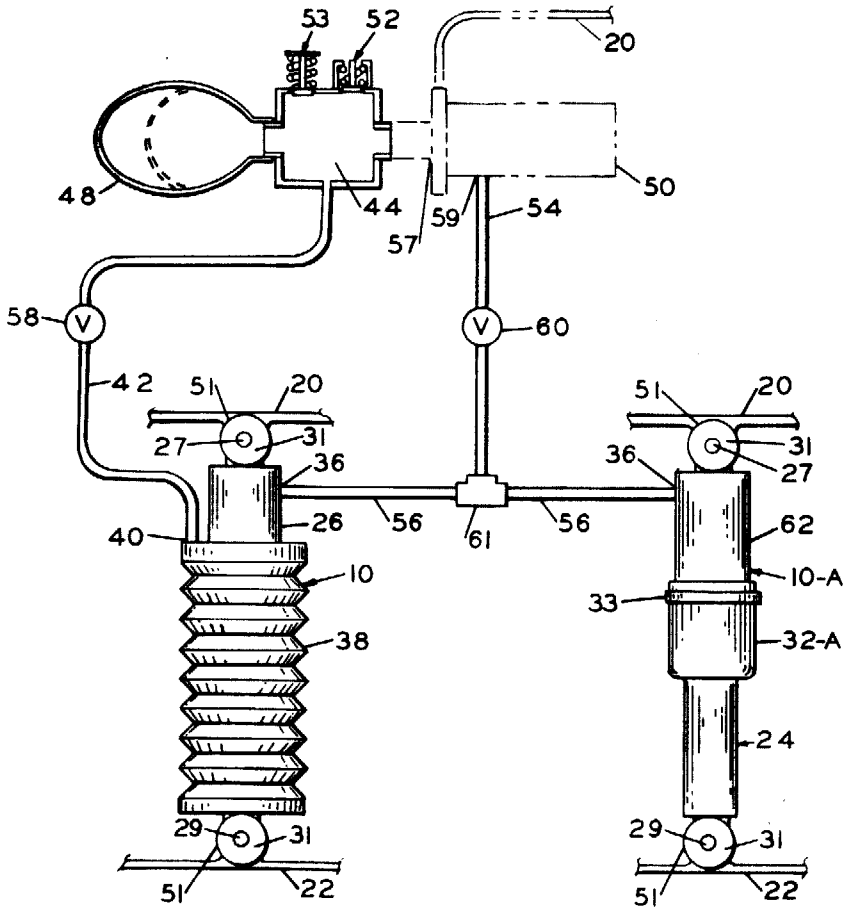
FIG. 1 is a side elevational view of a control system for a vehicle suspension system constructed in accordance with the present invention.

Referring in detail to the drawings, a portion of a vehicle suspension system including a novel height control system constructed in accordance with the present invention is illustrated in FIG. 1. For reasons of simplification a sprung weight portion 20 and an unsprung weight portion 22 are the only vehicle portions which are illustrated.

Figure 2:
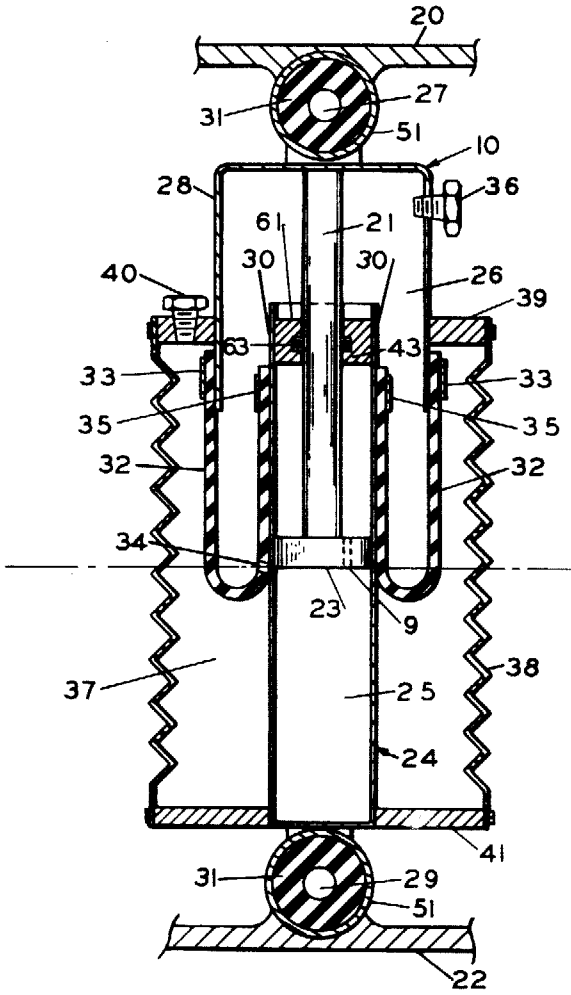
FIG. 2 is a side sectional view of a height control shock absorber apparatus comprising a portion of the apparatus shown in FIG. 1.
Figure 5:
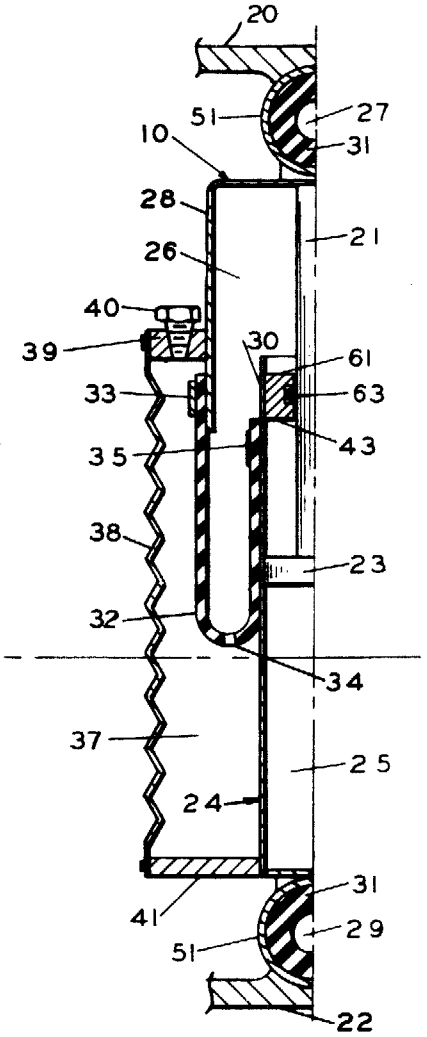
FIG. 5 is a view corresponding to FIG. 4, illustrating the position of the control orifice when the static loading of the vehicle is decreased.

FIG. 2 illustrates a variable shock absorber apparatus 10 adapted to vary the force exerted between the sprung and unsprung weights and also to perform a height detection and valving function and hence will be termed herein a height control shock absorber apparatus.

Figure 3:
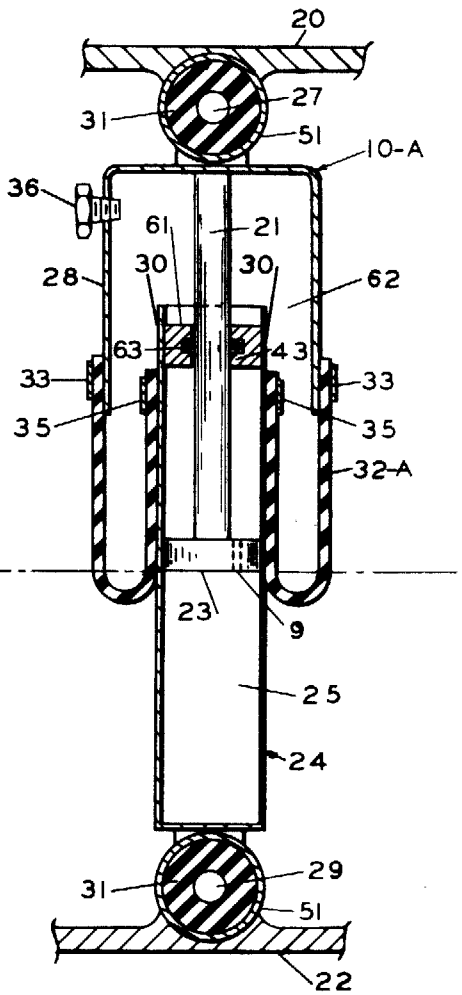
FIG. 3 is a side sectional view of a companion shock absorber apparatus which is controlled by the height control shock absorber apparatus of FIG. 2.

The unit 10–A, FIG. 3, is adapted to perform only the former function and hence will be termed herein a companion shock absorber apparatus.

The height control shock absorber apparatus 10 of FIG. 2 includes a shock absorber means or equivalent device indicated generally at 24 and connected between sprung and unsprung weight portions 20 and 22.

Shock absorber means 24 includes a cylindrical shock absorber wall 30 that forms a chamber 25. A piston 23 is mounted for reciprocation in the chamber and includes a restrictor 9, shown as an orifice, for the restricted passage of fluid from one side of piston 23 to the other side of the piston upon reciprocation of the piston in the cylinder.

Shock absorber means 24 further includes a piston rod 21 extended through a closure 43 provided with a fluid seal 63. The upper end of piston rod 21 is rigidly attached to the top of a control chamber wall 28 and also to a mounting ring 51.

A resilient bushing, formed of synthetic rubber or the like is disposed in mounting ring 51 and surrounds a mounting pin 27 that forms a portion of the sprung weight 20. Hence it will be understood that shock absorber piston 23, rod 21, and control chamber wall 28 are mounted stationary with respect to sprung weight portion 20.

The lower end of shock absorber wall 30 is mounted to unsprung weight portion 22 by a second mounting ring 51 that surrounds a second resilient bushing 31 and mounting pin 29. Hence it will be understood that cylindrical shock absorber wall 30 moves with unsprung weight portion 22 and reciprocates with respect to shock absorber piston 23.

Chamber 25 of the shock absorber means 24 contains a suitable conventional shock absorber fluid such as oil.

A vertically expansible and contractable control chamber, indicated generally at 26, FIG. 2 is operatively connected between sprung weight portions 20 and shock absorber means 24 and is formed by the previously mentioned chamber wall 28, shock absorber wall 30, closure 43, and a flexible third wall 32.

Flexible wall 32 is formed of flexible material, such as synthetic rubber or the like, and includes an outer end secured and sealed to the lower end of chamber 28 by a clamp ring 33. An inner end of flexible wall 32 is secured in sealed relationship to the previously mentioned shock absorber wall 30 by a clamp ring 35.

The generally U-shaped cross section of flexible wall 32 permits it to extend and retract along shock absorber wall 30 upon variations in pressure in control chamber 26 or upon reciprocation of the suspension system during travel of the vehicle.

Chamber 26 further includes an inlet 36 and an outlet, the latter being formed by a control orifice 34.

The preferred embodiment is a closed fluid circuit system as illustrated and described herein but it will be understood that the system may be open to the atmosphere without departing from the spirit of the present invention.

To provide for a closed fluid circuit a flexible casing or boot 38 surrounds a portion of control chamber 26 of apparatus 10 and includes an inlet-outlet port 40 that communicates with a reservoir chamber 44 via a line 42. chamber 44 includes an accumulator or expandable fluid supply which is shown in the form of a resilient bladder 48 that communicates with the inlet of a source of pressurized fluid or air compressor 50.

Bladder 48 serves to constantly supply supercharged air to compressor 50 and thereby increase the efficiency of the system.

Chamber 44 is provided with a pressure relief valve means indicated generally at 52 and an inlet valve 53 for supplying make-up air from the atmosphere as may be required to maintain a constant predetermined compressor inlet pressure range.

The outlet of compressor 50 is connected to control chamber 26 via a line 54, T fitting 61, and a line 56.

Flow control valves, which may be conventional needle valves 58 and 60, are preferably disposed in lines 42 and 54 in order to control the rate of flow of air to and from control chamber 26. The time rate of response of the system may be adjusted by manipulation of such flow control valves 58 and 60.

Referring next to FIGS. 1 and 3, the previously mentioned companion shock absorber apparatus is indicated generally at 10–A and mounted on the opposite side of the vehicle and is identical in structure to apparatus 10 except that no control orifice 34 or booth 38 are required since the previously mentioned orifice 34 of apparatus 10 also controls apparatus 10–A due to the fact that the control chambers 26 and 62 of both the apparatus are connected by line 56 as seen in FIG. 1.

The corresponding elements of apparatus 10 and 10–A are indicated by identical numerals.

Figure 8:
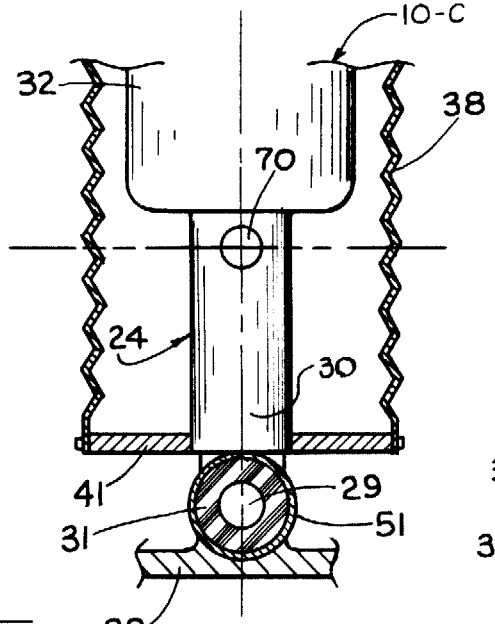
FIG. 8 is a second partial side sectional view of the modified shock absorber apparatus of FIG. 7.
Figure 7:
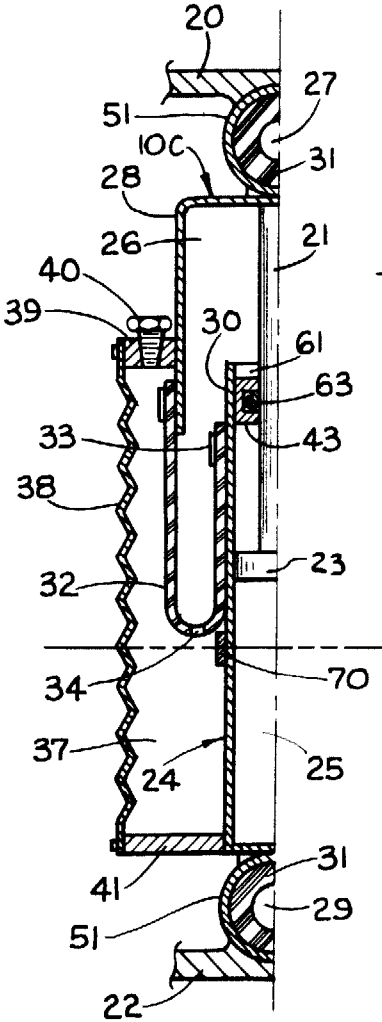
FIG. 7 is a partial side sectional view of a modified height control shock absorber apparatus constructed in accordance with the present invention.
Figure 13:
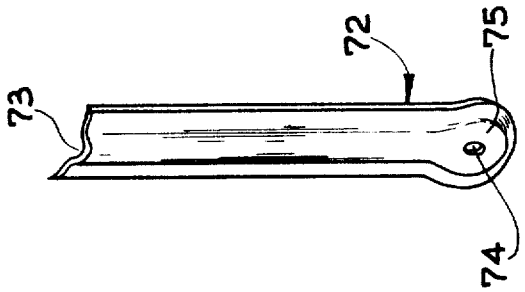
FIG. 13 is a perspective view of a passage and orifice forming strip comprising a portion of the apparatus of FIGS. 10–12.
Figure 12:
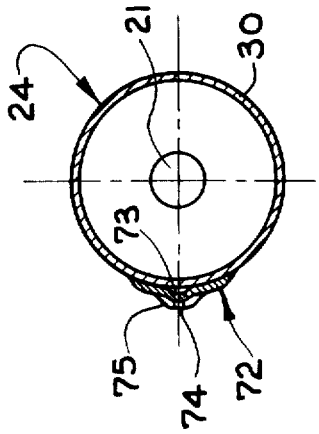
FIG. 12 is a top sectional view of the apparatus of FIGS. 10 and 11, the section being taken along the line 12—12 of FIG. 10.
Figure 11:
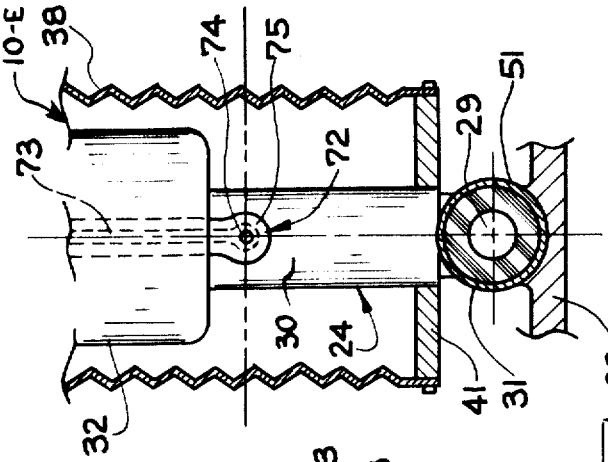
FIG. 11 is a second partial side sectional view of the apparatus of FIG. 10.
Figure 10:
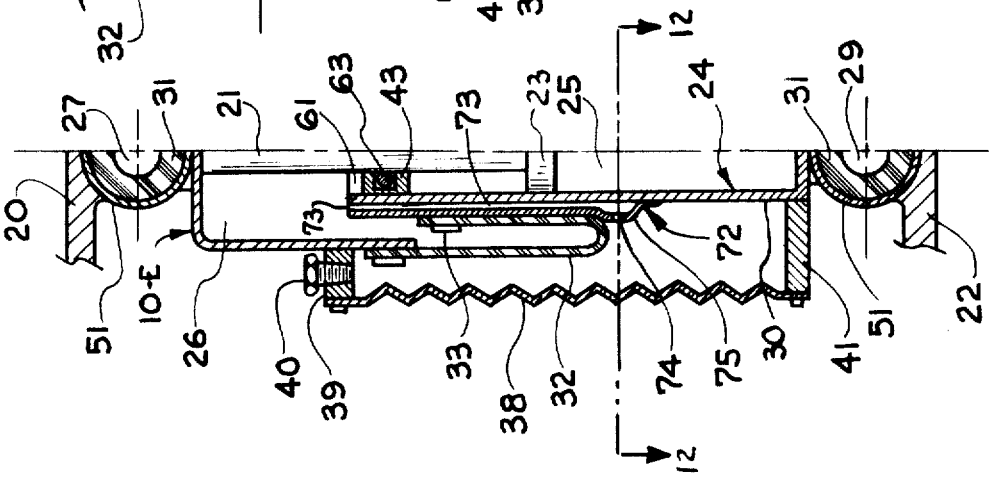
FIG. 10 is a partial side sectional view of another modified height control shock absorber apparatus constructed in accordance with the present invention.

Reference is next made to FIGS. 7 and 8 which illustrate a modified height control shock absorber apparatus 10–C which is identical to the apparatus 10, FIG. 2, except that a valve element 70 in the form of a protrusion is mounted on shock absorber wall 30 in engaging relationship with flexible wall 32 at the location of orifice 34. Such protrusion 70 functions to stretch flexible wall 32 at the portion thereof surrounding orifice 34 thereby increasing the sealing pressure at the height control valve means.

Figure 9:
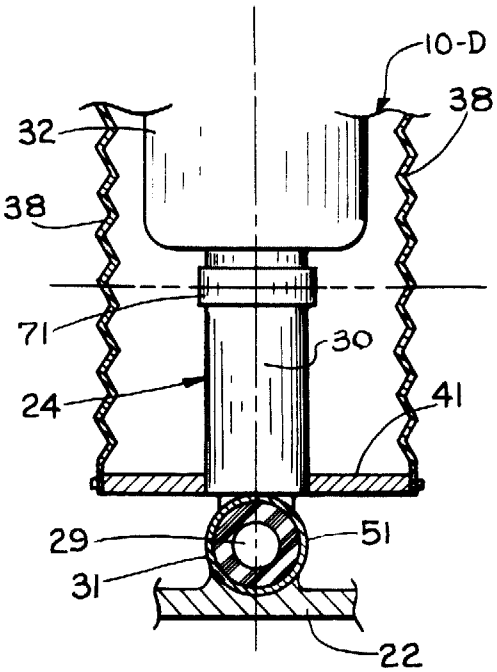
FIG. 9 is a partial side sectional view of a second modified height control shock absorber apparatus constructed in accordance with the present invention.

The second modification 10–D of FIG. 9 is identical to height control shock absorber apparatus 10, FIG. 2, except that a valve element 71 in the form of an annular protrusion is mounted on shock absorber wall 30 in engaging relationship with flexible wall 32 at an annular portion thereof that covers orifice 34. Hence annular protrusion 71 stretches the orifice confronting portion of flexible wall 32 and thereby increases the sealing pressure at the height control valve means.

Reference is next made to FIGS. 10–13 which illustrate another modified height control shock absorber apparatus constructed in accordance with the present invention, said apparatus being indicated generally at 10–E. The structural components of the apparatus of FIGS. 10–13 which are identical to those of the preceding figures are designated by identical numerals.

The apparatus of FIGS. 10–13 differs from those of the preceding figures in that it includes a passage and orifice forming strip indicated generally at 72 which is attached to the outer wall of shock absorber means 24 by welding, soldering or the like. Strip 72 is shown in isolated relationship in the perspective view of FIG. 13 and includes a central longitudinally extending channel that forms the longitudinally extending passage 73 and are enlarged lower end forming a protrusion 75 provided with a control orifice 74 disposed in the path of flexible wall 32 such that when the flexible wall moves longitudinally under variations in load, orifice 74 is covered or uncovered in the manner previously explained herein.

Figure 14:
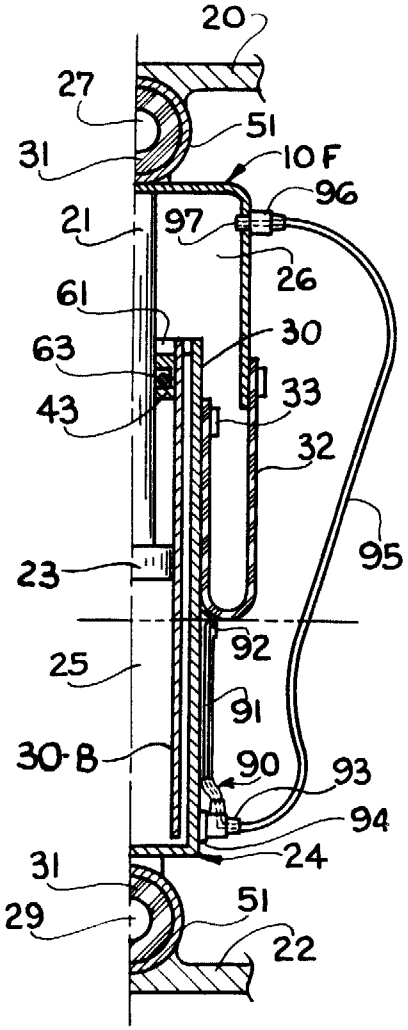
FIG. 14 is a partial side sectional view of another modified height control shock absorber apparatus constructed in accordance with the present invention.

Reference is next made to FIG. 14 which illustrates another modified height control shock absorber apparatus 10–F wherein a passage and orifice forming strip indicated generally at 90 is attached to the wall 30 of the shock absorber means 24, similar to that shown in FIGS. 10–13, except that strip 90 is inverted as compared to strip 72.

Here again strip 90 forms a longitudinally extending passage 91 and a control orifice 92 that includes a passage opening 93 which communicates with the interior of chamber 26 via a line 95, fitting 96, and an outlet port 97 for the chamber 26.

Figure 16:
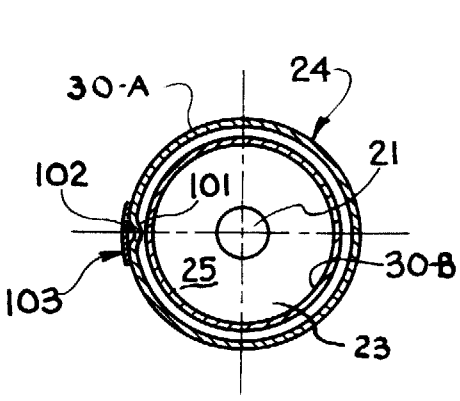
FIG. 16 is a partial top sectional view of the apparatus of [FIGS.] *FIG.* 15, the section being taken along the line 16—16 of FIG. 15.
Figure 17:
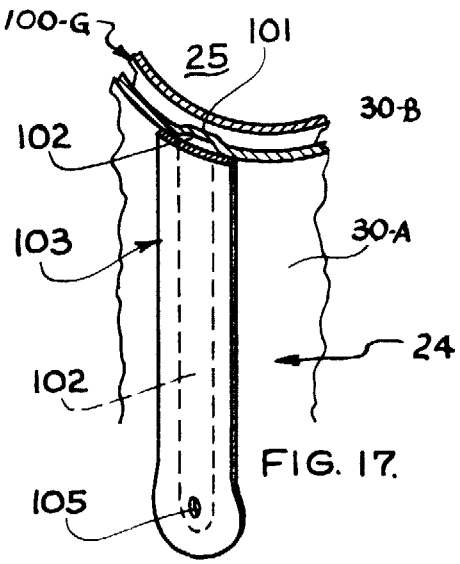
FIG. 17 is a partial perspective view showing a passage forming strip comprising a portion of the apparatus of FIGS. 15–16.
Figure 15:
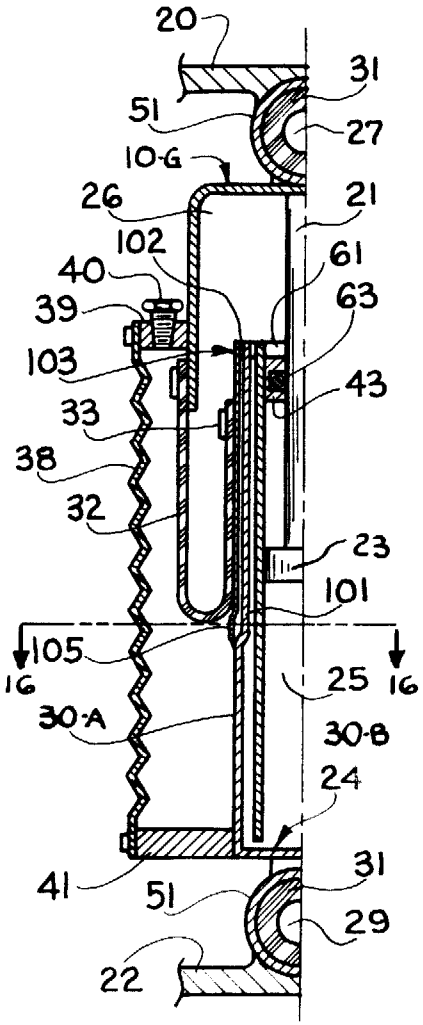
FIG. 15 is a partial side sectional view of another modified height control shock absorber apparatus constructed in accordance with the present invention.

Referring next to the embodiment of FIGS. 15–17, another modified height control shock absorber apparatus is indicated generally at 10–G and in such modification a longitudinally extending passage 102 is provided by a channel 101 formed in the wall means 100 of the shock absorber apparatus. Channel 101 is covered by a strip 103 welded to the wall 30–A and includes an orifice 105 disposed in the path of extendable flexible wall 32.

The operation of the modification of FIGS. 15–17 is identical to that previously described herein in that variations in loading causes flexible wall 32 to cover or uncover orifice 105 as may be required to effect height control corrections.

Figures 18, 19:
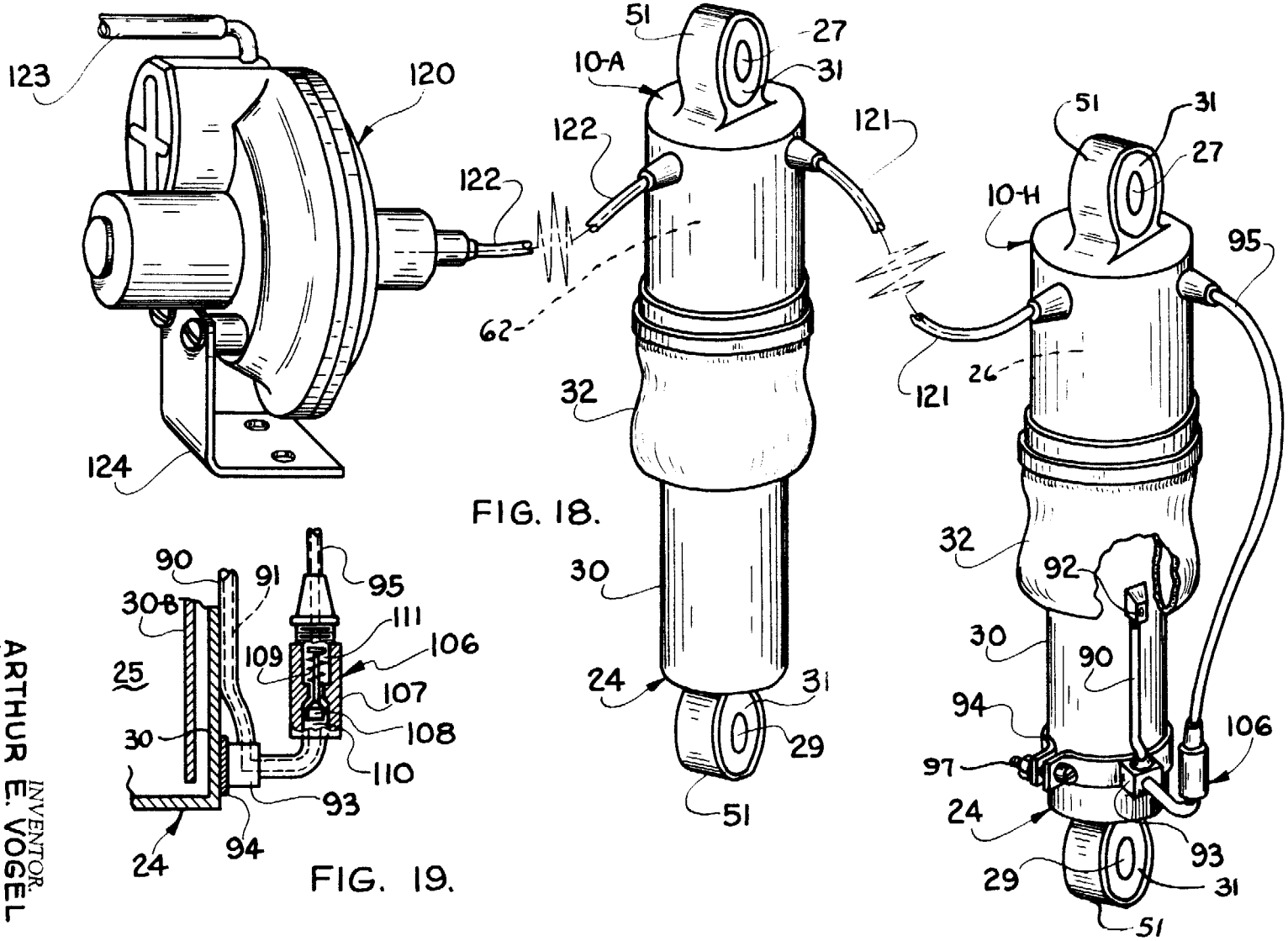
FIG. 18 is a perspective view of a modified height control system constructed in accordance with the present invention.
FIG. 19 is a partial side sectional view through a modified height control shock absorber apparatus of the system of FIG. 18, the section being taken along a vertical plane through the centerline of the apparatus.

Reference is next made to FIGS. 18 and 19 which illustrates a modified height control system that includes still another modified height control shock absorber apparatus 10–H which operates in conjunction with a companion shock absorber apparatus 10–A. Height control apparatus 10–H includes a passage and orifice forming assembly that includes a tube 90 and orifice block 92 which are mounted on a junction block 93 which is in turn mounted on the outer wall 30 of shock absorber means 24 by a longitudinally adjustable clamp ring 94. When a bolt and nut assembly 97 is loosened clamp ring 94 is free for longitudinal sliding adjustment along wall 30 of shock absorber means 24 thereby providing means for adjusting the location of orifice 93 with respect to flexible wall 32. This provides means for readily establishing or varying the normal configuration datum of the system.

As is best seen in FIG. 19 the height control shock absorber apparatus 10–H includes a pressure control valve indicated generally at 106 which communicates with height control chamber 26 via a line 95.

As seen in FIG. 19 pressure control valve 106 includes a valve element 108 disposed in a valve chamber 110, said valve element being constantly biased against its seat by a compression spring 109 disposed in spring chamber 111.

It will now be understood that pressurized fluid is released from height control chamber 26, when orifice 92 is uncovered and the pressure in the chamber 26 exceeds the predetermined pressure value required to overcome the force of valve spring 109. Fluid is then released via line 95, valve chambers 111 and 110, junction box 93, longitudinally extending passage 91 formed by tube 90, and control orifice 92.

Pressurized fluid for the system of FIG. 18 is supplied by an air compressor indicated generally at 120 which is mounted to the frame of the vehicle by a bracket 124. Compressor 120 includes an inlet 123 and an outlet line 122 that is connected to the height control chamber 62 of companion shock absorber apparatus 10–A. Chamber 62 of shock absorber apparatus 10–A is in turn connected to chamber 26 of the height control shock absorber apparatus 10–H by a line 121. Hence it will be understood that the two chambers 26 and 62 are commonly connected and always at the same pressure in the same manner as the system of FIGS. 1–5.

Now referring to FIGS. 1, 4, 6, and 5, the operation of the control system will be described.

Figure 4:
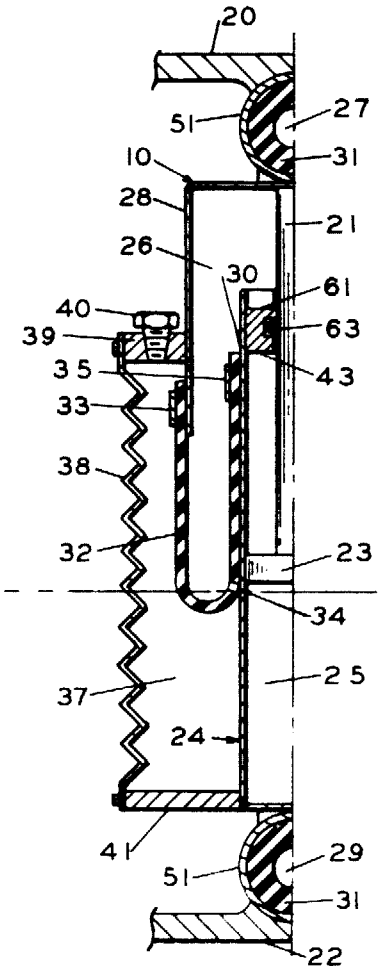
FIG. 4 is a partial side sectional view of the height control shock absorber apparatus shown in FIG. 2 which view illustrates the control orifice in its normal threshold position which is the position of the orifice when the vehicle suspension system is at normal configuration.

At normal configuration, the sprung and unsprung weight portions 20 and 22 are at a predetermined height differential and control orifice 34 in flexible wall 32 is in an equilibrium or threshold position illustrated in FIG. 4.

The inner portion of flexible wall 32 is in sealed rolling contact with wall 30 which, in the preferred embodiment illustrated, is the outer wall of shock absorber 24. As the static load increases or decreases the height differential between sprung and unsprung weight portions 20 and 22 varies, the portion of flexible wall 32 in contact with wall 30 increases and decreases proportionally. In turn, the position of control orifice 34 changes from the equilibrium position seen in FIG. 4 to either the open position of FIG. 5 or to the closed position of FIG. 6.

With the suspension system in the equilibrum position of FIG. 4 pressurized fluid from compressor 50 is constantly supplying control chambers 26 and 62 and escapes from chamber 26 through control orifice 34 at the same rate as it enters.

Figure 6:
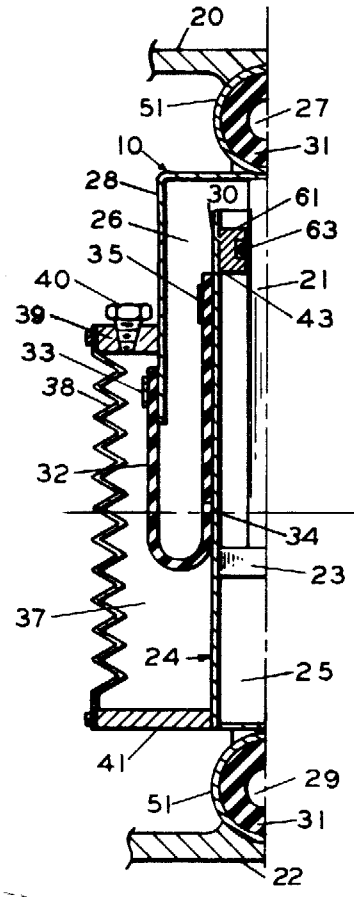
FIG. 6 is a view corresponding to FIG. 4 that illustrates the position of the control orifice when the static loading of the vehicle is increased.

When the static load in the vehicle increases, FIG. 6, and causes the height differential between sprung and unsprung weight portions 20 and 22 to decrease, then chamber walls 28 of control chambers 26 and 62, which are rigidly attached to sprung weight portion 20, move downwardly in a corresponding manner. Flexible wall 32 then extends such that the portion in rolling contact with wall 30 increases and control orifice 34 is closed by wall 30 as seen in FIG. 6. The pressure in chamber 26 then increases and forces chamber 26 and hence weight portion 20 upwardly. The portion of flexible wall 32 in contact with wall 30 is thereby decreased and orifice 34 is again opened when it reaches the equilibrium position of FIG. 4. When the new equilibrum condition for the increased static load is established the pressures in control chambers 26 and 62 will of course be higher.

When the static loading of the vehicle is decreased, such as occurs when passengers leave the vehicle, the reverse steps take place. Obviously a decrease in pressure in chambers 26 and 62 is required to return the sprung and unsprung weight portions 20 and 22 from the configuration of FIG. 5 to the normal configuration of FIG. 4. This is accomplished when control orifice 34 is moved away from wall 30 to an open position as the portion of flexible wall 32 in contact with wall 30 decreases upon upward travel of wall 28. Pressurized fluid is thereby allowed to escape at a relatively rapid rate and the equilibrium position of FIG. 5 will be restored when the pressure in chamber 26 has lessened sufficiently to permit the wall 28, flexible wall 32 and control orifice 34 to return to the normal threshold position of FIG. 4.

It will be understood that the closed circuit system illustrated in FIG. 1 can be converted to an open system by eliminating boot 38 from height control shock absorber unit 10 and the fluid return line 42. In such instance control orifice 34 would exhaust directly to the atmospheric environment.

It should further be mentioned that in an open circuit system the chamber 44, bladder 58 and valves 52 and 53 can be eliminated.

With reference to FIG. 1, the time required for response to changes in static load conditions may be adjusted by needle valves 58 and 60 which act as flow restrictors.

From the foregoing description, it is apparent that the control of any of the orifices 34, 74 or 92 is effective for maintaining the desired distance between the sprung and unsprung weight portions of the vehicle, regardless of variation of the static load on the sprung weight. Specifically, referring to FIGS. 4, 5 and 6, and such is applicable to all embodiments of the invention, it will be understood that control orifice 34 functions as sensing means for determining departure of the suspension from normal configuration of FIG. 4 and further establishes the proper pressure required in chambers 26 and 62 to assist the vehicle spring in maintaining the predetermined normal suspension configuration. The movement of flexible wall 32 with respect to wall 30 in response to change in static load conditions automatically positions orifice 34 so as to effect the valving function necessary to maintain the predetermined normal suspension configuration.

It is also apparent from the foregoing, and also it has been found by actual tests during heavy rains or freezing weather, that should water ladened air enter the system of the type wherein the inlet of the compressor and the outlet of the control chamber are directly connected with atmosphere, i.e., when the system is converted to an open system by eliminating the boot, neither water nor ice is present at the air outlet.

While the form of embodiment herein shown and described, constitutes preferred form, it is to be understood that other forms may be adopted falling within the scope of the claims that follow.

What is claimed is:

1. A controlled vehicle suspension system comprising, in combination, a sprung weight portion, and unsprung weight portion; compressor means for producing a flow of pressurized air and including a compressor outlet; height control means including a rigid cylindrical wall connected to one of said weight portions and a flexible wall in extendable and retractable sealed surrounding relationship with said rigid cylindrical wall, said flexible wall being connected to a second rigid wall, the said second wall being connected to the other of said weight portions and forming a resilient chamber between said weight portions including an inlet connected to said compressor outlet, one of the walls including an orifice [that cooperates with the other wall] *for controlling the release of air from said chamber, said orifice being disposed to be at least partly uncovered and covered directly by the flexible wall of the chamber upon extension and retraction, respectively, of the walls of the chamber.* [to form a flow control valve means for the controlled release of said flow of pressurized air from said height control means.]

2. The suspension control apparatus defined in claim 1 that includes a flexible boot surrounding said walls and forming an exhaust chamber for receiving air released from said orifice.

3. The suspension control apparatus defined in claim 1 wherein said orifice is in said extendable flexible wall.

4. The suspension control apparatus defined in claim 1 that includes damping means for decreasing shock effects.

5. A controlled vehicle suspension system comprising, in combination, a sprung weight portion; an unsprung weight portion; compressor means for producing a flow of pressurized air and including a *compressor inlet and a* compressor outlet; *height control apparatus* [shock absorber means] including a shock absorber cylinder connected to one of said weight portions, a shock absorber piston mounted for reciprocation in said shock absorber cylinder and connected to the other of said weight portions, [shock absorber fluid confined in said shock absorber cylinder,] and an outer shock absorber wall means; *a* [and resilient] control chamber [means] movable with said other weight portion and including a rigid chamber wall portion having a *chamber inlet* [first port] for the admission of a flow of pressurized fluid from said compressor outlet and a flexible [chamber] wall means in extendable and retractable surrounding relationship with said shock absorber wall means; *two-position valve means on said height control apparatus responsive to height relationship between the sprung and unsprung weight portions to control the pressure in the control chamber to maintain a predetermined height relationship between the weight portions, said valve means comprising a first valve portion in the form of a control orifice through one of said wall means and a second valve portion on the other of said wall means for opening and closing said control orifice in response to normal vehicle road movements to continually exhaust air from said control chamber during normal vehicle road movements; and air supply means for connecting said compressor inlet to atmosphere to supply make-up air to the system and including a reservoir chamber provided with a reservoir chamber inlet connected to said control orifice for receiving air exhausted from said control chamber under dynamic conditions.* [one of said wall means including a control orifice forming a second port for the controlled release of said flow of pressurized fluid.]

6. A controlled vehicle suspension system comprising, in combination, a sprung weight portion; an unsprung weight portion; a shock absorber apparatus comprising a shock absorber means including a shock absorber wall and upper and lower ends for connection with said sprung and unsprung weight portions, control chamber means connected to one of said weight portions and including a first port for the passage of pressurized fluid and a flexible wall portion in extendable and retractable surrounding relationship with said shock absorber wall, one of said walls including a control orifice forming a second port for *controlling the release of air from said control chamber means, said orifice being disposed to be at least partly uncovered and covered directly by the flexible wall portion of the control chamber means upon extension and retraction, respectively, of the walls of the control chamber means;* [the passage of pressurized fluid;] a flexible boot connected between said control chamber means and said shock absorber means and forming a chamber communicating with said second port, said chamber including a third port; and means forming a source of pressurized fluid and including an outlet communicating with said first port and an inlet communicating with said third port.

7. A controlled vehicle suspension system comprising, in combination, a sprung weight portion; unsprung weight portions; a first shock absorber apparatus comprising a shock absorber means including a shock absorber wall and upper and lower ends for connection with said sprung and unsprung weight portions, control chamber means connected to one of said weight portions and including a port for the passage of pressurized fluid and a flexible wall in extendable and retractable surrounding relationship with said shock absorber wall; a second shock absorber apparatus comprising a second shock absorber means including a second shock absorber wall and upper and lower ends for connection with said sprung and unsprung weight portions, a second control chamber means connected to one of said weight portions and including a second port for the passage of pressurized fluid and a second flexible wall in extendable and retractable surrounding relationship with said second shock absorber wall; passage means connecting the interiors of the two above mentioned control chamber means, including a control orifice through one of said walls of one of said shock absorber apparatus for controlling the flow of fluid through said two control chamber means, *said orifice being disposed to be at least partly uncovered and covered directly by another of said walls upon extension and retraction, respectively, of the second mentioned flexible wall and the second mentioned shock absorber wall relative to one another; and a compressor for supplying pressurized air to the first mentioned port.*

8. The system of claim 1 and means forming a protrusion at said orifice for increasing the sealing effect at said flow control valve means.

9. The system of claim 1 wherein said first wall includes a longitudinally extending passage provided with a passage inlet communicating with said chamber and a passage outlet forming said orifice and disposed in the path of movement of said movable wall.

10. The suspension control apparatus defined in claim 9 wherein said passage and orifice are formed by a channelled strip on said rigid cylindrical wall means.

11. The suspension control apparatus defined in claim 9 wherein said passage and orifice are formed by a channel in said wall means and a strip on said wall means that covers said channel.

12. The suspension control apparatus defined in claim 9 that includes a pressure control valve between said longitudinally extending passage and said chamber.

13. The system of claim 1 including longitudinal passage forming means disposed along the longitudinal axis of said rigid cylindrical wall means and including a passage inlet communicating with said chamber and a passage outlet forming said orifice and disposed in the path of movement of said movable wall; and means adjustably mounting said passage forming means on said wall means whereby movement of said passage forming means changes the location of said orifice.

14. The suspension apparatus defined in claim 13 that includes a pressure control valve communicating with said passage forming means.

15. A controlled suspension system for a vehicle having an unsprung weight portion and a sprung weight portion, which system comprises:

(A) air compressor [means] including an inlet communicating with atmosphere and a compressor outlet;

(B) means *including two joined walls forming a closed chamber, said walls being vertically expandable and contractable relative to one another, one of said walls being connected with the unsprung weight portion of the vehicle and the other of said walls being flexibly connected with the sprung weight portion of the vehicle, said chamber having* [forming a closed chamber having the characteristic of expanding and contracting vertically and disposed between the unsprung and sprung weight portions of the vehicle, said last mentioned means having]:

(1) a chamber inlet;

[(2) a passage connecting said compressor outlet and said chamber inlet;]

(2) [(3)] an outlet orifice [open] *openable* to atmosphere *for controlling the flow of air, emanating from the compressor outlet, to and from the closed chamber, said orifice being disposed to be at least partly uncovered and covered directly by the vertical movements of the flexible wall of the chamber upon expansion and contraction, respectively, of the chamber;* [, said last mentioned means including also;

(4) valve means for controlling the flow of air from the outlet orifice, said valve means being associated with one of said weight portions and responsive to the vertical separating movement and vertical movement toward one another of the unsprung and sprung weight portions for effecting at least partial opening and closing, respectively, of the outlet orifice]

(*C*) *means forming a passage for connecting the compressor outlet with the chamber inlet.*

[16. A controlled suspension system as defined in claim 15, characterized in that one of the walls of the means forming the chamber is flexible and is movable upon expansion and contraction, respectively, of the chamber to uncover and cover the outlet orifice.]

17. A controlled suspension system as defined in claim 15, characterized in that the outlet orifice is stationary [, and further characterized in that the means (B)(4) includes a portion of the means (B) which is movable upon expansion and contraction, respectively of the chamber to uncover and cover the outlet orifice].

18. A controlled suspension system as defined in claim 15, characterized in [that one of the walls of the means forming the chamber is flexible and] that the orifice is in a section of the flexible wall, [and further characterized in that a portion of the valve means (B)(4) is formed by a stationary portion of the means (B) to which the orifice section of the flexible wall moves to be uncovered and to be covered upon expansion and contraction, respectively, of the chamber].

[19. A controlled suspension system as defined in claim 15, characterized in that the means (B)(4) is responsive to expansion and contraction, respectively, of the chamber.]

20. A controlled suspension system as defined in claim 15, characterized in that the compressor is operated constantly.

21. A controlled suspension system as defined in claim 15, characterized to include:

(*D*) [(C)] means forming a second closed chamber connected in series with the first mentioned chamber and interposed between the outlet of the compressor and the inlet of the first mentioned chamber.

[22. A controlled suspension system as defined in claim 19, characterized in that one of the walls of the means forming the chamber is flexible and is movable upon expansion and contraction, respectively, of the chamber to uncover and cover the outlet orifice.]

[23. A controlled suspension system as defined in claim 19, characterized in that the outlet orifice is stationary, and further characterized in that a portion of the valve means (B)(4) is formed by a portion of the means (B) which is movable upon expansion and contraction, respectively, of the chamber to uncover and cover the outlet orifice.]

[24. A controlled suspension system as defined in claim 19, characterized in that one of the walls of the means forming the chamber is flexible and that the orifice is in a section of the flexible wall, and further characterized in that a portion of the valve means (B)(4) is formed by a stationary portion of the means (B) to which the orifice section of the flexible wall moves to be uncovered and to be covered upon expansion and contraction, respectively, of the chamber.]

*25. A control system as defined in claim 15, characterized in that the orifice is adjustably mounted to one of said weight portions.*

*26. The controlled vehicle suspension ssytem of claim 5 wherein said reservoir chamber includes an inlet one-way check valve that communicates with atmosphere.*

*27. The controlled vehicle suspension system of claim 5 wherein said reservoir chamber includes a pressure relief valve.*

*28. The controlled vehicle suspension system of claim 5 characterized by means including said reservoir chamber for supplying air to said compressor during dynamic operation without drawing air from the atmosphere.*

*29. A controlled vehicle suspension system comprising in combination a sprung weight portion, and unsprung weight portion; compressor means for producing a flow of pressurized air and including a compressor outlet; height control means including a rigid cylindrical wall connected to one of said weight portions and a flexible wall in extendable and retractable sealed surrounding relationship with said rigid cylindrical wall, said flexible wall being connected to a second rigid wall, the said second wall being connected to the other of said weight portions and forming a resilient chamber between said weight portions including an inlet connected to said compressor outlet, one of the walls having an unobstructed orifice associated with the chamber for controlling the release of air from said chamber, one of said walls being positioned for closing an end of the orifice upon retraction of the walls of the cylinder.*

*30. A system as defined in claim 29, characterized in that the orifice is in the flexible wall.*

*31. A controlled suspension system for a vehicle having an unsprung weight portion and a sprung weight portion, which system comprises:*

*(A) air compressor including an inlet communicating with atmosphere and a compressor outlet;*

*(B) means including two joined walls forming a closed chamber, said walls being vertically expandable and contractable relative to one another, one of said walls being connected with the unsprung weight portion of the vehicle and the other of said walls being flexibly connected with the sprung weight portion of the vehicle, said chamber having:*

*(1) a chamber inlet;*

*(2) an unobstructed orifice open to atmosphere for controlling the flow of air emanating from the compressor outlet through the chamber, one of the walls of the chamber being positioned for closing one end of the orifice upon retraction of the walls of the chamber;*

*(C) means forming a passage for connecting the compressor outlet with the chamber inlet.*

*32. A system as defined in claim 29, characterized in that the closing of the end of the orifice is by moving the flexible wall over the orifice.*

*33. A system as defined in claim 31, characterized in that the closing of the end of the orifice is by moving the flexible wall over the orifice.*

*34. A controlled vehicle suspension system comprising in combination, a sprung weight portion; an unsprung weight portion; a shock absorber apparatus comprising a shock absorber means including a resilient chamber, a shock absorber wall and upper and lower ends for connection with said sprung and unsprung weight portions; and control means adjustably mounted on said shock absorber wall for selectively establishing the distance between said sprung and unsprung weight portions, said control means including an orifice for controlling the release of air from said chamber.*

*35. The apparatus defined in claim 34 wherein said resilient chamber includes a flexible wall that extends and retracts along said shock absorber wall during road imposed oscillations of said suspension system; and tube means forming a longitudinal passage strapped to said shock absorber wall for longitudinal adjustment relative thereto, said tube means including an outlet forming said orifice that is covered and uncovered by said flexible wall.*

*36. The apparatus defined in claim 35 wherein said control means includes a junction block; an adjustable clamp ring connected to said junction block and in surrounding clamped relationship with said shock absorber wall; and a tube member extending from said junction block to said outlet forming said orifice.*

*37. The apparatus defined in claim 36 wherein said junction block includes a pressure control valve for the flow of air through said orifice.*

*38. The apparatus defined in claim 1 wherein said orifice is formed by the hole in a tube that is adjustably clamped on said rigid cylindrical wall.*

*39. The apparatus defined in claim 5 wherein said control orifice is provided by a hole at the end of a tube adjustably mounted on said shock absorber cylinder, said flexible wall means forming said second valve portion for controlling the flow from said control chamber under dynamic conditions.*

*40. The system of claim 7 wherein said orifice is formed by the outlet of a tube mounted on said second shock absorber wall; and a second passage means connecting the second control chamber with said tube, said chambers serving to substantially isolate said second passage means from any contaminants in said pressurized air from said compressor.*

References Cited

The following references, cited by the Examiner, are of record in the patented file of this patent or the original patent.

UNITED STATES PATENTS

| | | | |
|---|---|---|---|
| 3,145,985 | 8/1964 | De Carbon | 267—64 B |
| 3,046,003 | 7/1962 | Schultz | 267—65 B |
| 3,372,919 | 3/1968 | Jackson | 267—65 B |
| 3,280,760 | 9/1965 | Lucien | 280—6 |
| 3,120,962 | 2/1964 | Long | 280—6 |
| 3,037,763 | 6/1962 | Steinhagen. | |

PHILIP GOODMAN, Primary Examiner

U.S. Cl. X.R.

280—124 F; 267—65 D